United States Patent [19]
Barlow

[11] Patent Number: 5,535,857
[45] Date of Patent: Jul. 16, 1996

[54] BRAKE DISC AND METHOD FOR ITS PRODUCTION

[75] Inventor: John Barlow, Walsall, United Kingdom

[73] Assignee: GKN Sankey Limited, Telford, United Kingdom

[21] Appl. No.: 447,907

[22] Filed: May 23, 1995

[51] Int. Cl.[6] .................... F16D 65/10; B22F 7/02
[52] U.S. Cl. .................. 188/218 XL; 188/251 M; 192/107 M
[58] Field of Search .............. 188/218 R, 218 XL, 188/251 M, 264 A, 264 G; 192/107 C, 107 R, 107 M

[56] References Cited

U.S. PATENT DOCUMENTS 5,325,941  7/1994  Farinacci et al. ............... 188/218 XL
5,372,222  12/1994  Rhee et al. ..................... 188/218 XL

FOREIGN PATENT DOCUMENTS

| 0163835 | 9/1983 | Japan ............ 188/218 XL |
| 0116326 | 5/1989 | Japan ............ 188/218 XL |
| 5044752 | 2/1993 | Japan ............ 188/218 XL |
| 1375916 | 4/1974 | United Kingdom . |
| 2257213 | 6/1993 | United Kingdom . |

Primary Examiner—Robert J. Oberleitner
Assistant Examiner—Chris Schwartz
Attorney, Agent, or Firm—Marshall, O'Toole, Gerstein, Murray & Borun

[57] ABSTRACT

A brake disc, for a disc brake assembly comprising at least one portion affording a wear surface, said portion comprising a rigid porous ceramic body infiltrated with a light metal alloy.

15 Claims, 2 Drawing Sheets

BRAKE DISC AND METHOD FOR ITS PRODUCTION

BACKGROUND TO THE INVENTION

This invention relates to a disc of a disc brake assembly of the type which is well known for example for industrial and automotive applications.

In such an assembly the disc, or rotor as it is sometimes known, is rotatable with a member to be braked such as a wheel. A pair of opposed relatively axially movable brake pads carried in a brake caliper are arranged one on either side of the disc so as to exert braking pressure on the rotating disc, generated typically by a hydraulic piston and cylinder arrangement, when it is desired to brake the said member. The wear surfaces of the disc which are acted on by the opposed brake pads comprise annular planar surfaces, one on each side of the disc, located radially intermediate the radially inner and outer edges of the disc.

The discs of such disc brake assemblies are typically formed of a ferrous alloy having the properties necessary to withstand repeated applications of braking pressure by the brake pads. Such properties include good wear resistance and good thermal conductivity, and conventional brake discs have been formed of cast iron to provide these properties. For automotive applications, especially for racing motorcycles or racing cars, there is a requirement to reduce weight wherever possible and hence it has been proposed to utilise a brake disc formed of a lighter weight material than ferrous alloys.

For example, it has been proposed to utilise, aluminum alloys instead of ferrous alloys because a brake disc formed of an aluminum alloy would be of much less weight than a correspondingly sized ferrous alloy disc. An aluminum alloy disc would also exhibit the required good thermal conductivity but a major disadvantage is that the melting point of an aluminum alloy is much lower than that of a ferrous alloy, also the wear resistance of an aluminum alloy is much less than that of e.g. cast iron. Repeated applications of braking pressure to an aluminum alloy disc would generate sufficient heat to soften the aluminum alloy and destroy the disc.

To overcome the problems inherent with aluminum alloys one proposal has been to form a brake disc from a metal matrix composite comprising discrete particles, fibres or whiskers of a ceramic material distributed throughout an aluminum alloy matrix. This proposal, although imparting the necessary high wear resistance properties to the brake disc, is not satisfactory because the high temperatures generated by the type of severe, repeated braking conditions encountered in racing, still results in softening of the aluminum alloy matrix. If the matrix is softened sufficiently it will be expelled, together with the ceramic particles, fibres or whiskers contained therein, from those wear areas of the disc which are acted on by the brake pads and the disc will effectively be destroyed.

Another proposal to overcome the problems inherent with aluminum alloy brake discs has been to coat at least the wear surfaces of the disc with a wear resistant and temperature resistant material. This proposal would increase the production cost of each brake disc and is not satisfactory in that the high temperatures generated during severe braking may still cause the aluminum alloy body of the disc to soften with consequential risk of sudden total failure.

It is an object of the present invention to provide a new and improved brake disc which will overcome the problems associated hitherto with aluminum alloy discs. It is also an object of the invention to provide a new and improved method for the production of such a brake disc.

SUMMARY OF THE INVENTION

In accordance with the invention there is provided a brake disc, for a disc brake assembly, comprising at least one portion affording a wear surface, said portion comprising a rigid porous ceramic body infiltrated with a light metal alloy.

Also in accordance with the invention there is provided a method of producing a brake disc, for a disc brake assembly, comprising at least one portion affording a wear surface, comprising the steps of forming a rigid porous ceramic body substantially to the required finished configuration of said at least one portion affording a wear surface of the brake disc and infiltrating the pore structure of said body with a light metal alloy.

Typically the rigid porous body may have a porosity lying in the range 25% to 45% voids.

Accordingly said portion comprises 55 vol. % to 75 vol. % of said rigid porous body and 45 vol. % to 25 vol. % of said light metal alloy.

The rigid porous body may have a pore size lying in the range 0.02 mm to 2 mm.

The material comprising the porous body is selected to have the properties of good wear resistance and good thermal conductivity necessary to withstand the conditions under which the brake disc is to operate. A good wear resistant and thermally conductive material is silicon carbide although other ceramic materials having the required properties may be selected.

Said rigid porous ceramic body is conveniently formed by sintering ceramic particles into a coherent mass to provide an interconnected pore structure for receiving infiltrant molten light metal alloy during production of the brake disc. The degree of porosity is such as to ensure that the pore structure of the sintered body is capable of receiving the infiltrant molten light metal alloy and is thus related to the selected method of infiltration.

Such method of infiltration may comprise a casting technique wherein a said porous ceramic body is located in a mould and molten light metal alloy is cast around said body so as to infiltrate the pore structure thereof. For example, a squeeze casting technique may be utilised wherein, whilst still molten, the light metal alloy is subjected to conditions of sustained temperature and pressure. In such a squeeze casting technique a more dense porous ceramic body may be employed than would be possible if for example a gravity casting technique were to be utilised.

The rigid ceramic body may be formed only to the general configuration of a wear portion of the disc which affords said wear surface, or it may be formed substantially to the full configuration of the disc so as to provide a disc element of corresponding configuration. I.e. the rigid ceramic body may be formed as an annulus having a radial dimension less than that of the finished disc or the rigid ceramic body may be formed as an annulus having a radial dimension substantially the same as that of the finished disc.

Preferably the infiltrated ceramic body extends throughout the thickness of the wear portion and affords a pair of opposed wear surfaces. A brake disc in accordance with the invention will maintain its structural integrity even under severe braking conditions because even if local softening of the light metal alloy occurs the ceramic body will maintain the integrity of the disc element as a whole. The said light metal alloy preferably comprises a high temperature aluminum alloy such as that designated 2618A (International Designation).

BRIEF DESCRIPTION OF THE DRAWINGS

Other features of the invention will become apparent from the following description given herein solely by way of example with reference to the accompanying drawings wherein.

DESCRIPTION OF THE PREFERRED EMBODIMENTS

Figure 1:
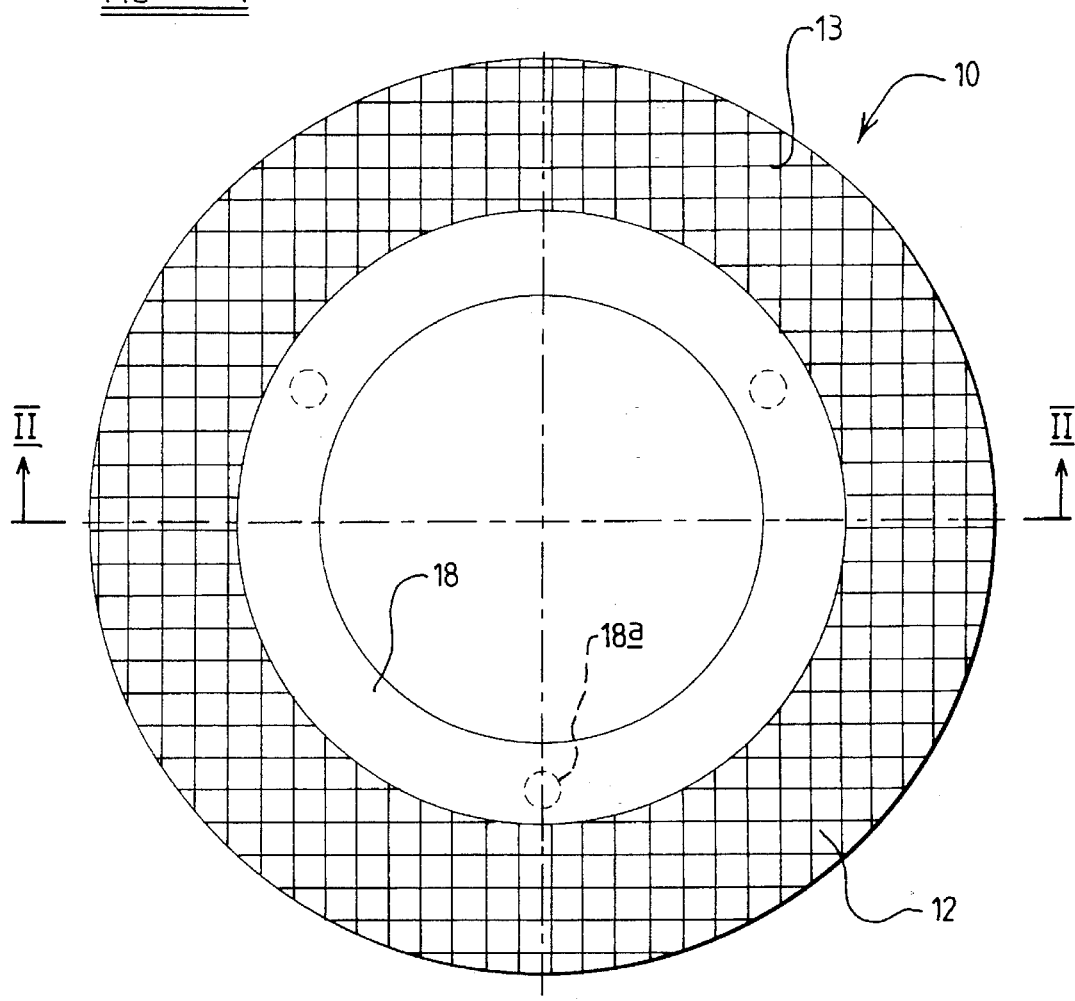
FIG. 1 is a side elevation of a brake disc in accordance with the invention.
Figure 2:
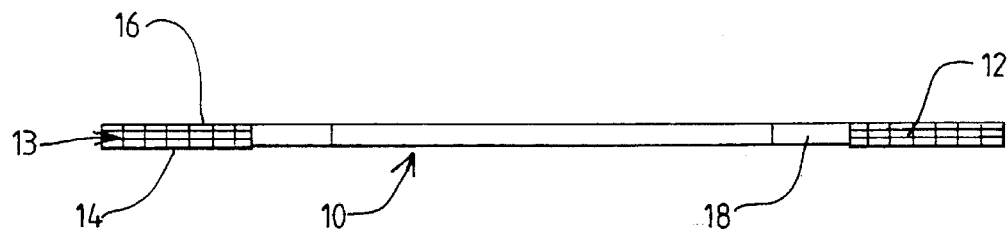
FIG. 2 is a cross-sectional view taken on the line II–II of FIG. 1.

A brake disc 10 shown in the drawings may be of any conventional size comprising an annulus has opposed planar annular surfaces. Typically the annulus may have an external diameter approximating 300 mm, an internal diameter approximating 140 mm and a thickness of around 7 mm.

In accordance with the invention the brake disc 10 comprises a rigid porous ceramic body 12 infiltrated with a light metal alloy and in the embodiment illustrated, said porous ceramic body is of annular form having a maximum radial dimension substantially the same as that of the disc 10 and an internal radial dimension which is less than that of the disc. In the finished disc, the ceramic body 12 may thus be located as shown in the drawing so as to extend throughout the thickness of the wear portion of the disc and afford opposed wear surfaces 14, 16 of the disc which are subjected to the action of the brake pads of the brake assembly.

In one illustrative embodiment of production of a brake disc 10 of the type shown in the drawing, the annular rigid porous ceramic body 12 is produced as a sintered coherent mass of ceramic particles. Such particles are typically silicon carbide particles whereby the sintered mass thereof will have properties of good wear resistance and good thermal conductivity. Alternatively, the rigid porous ceramic body may be produced as a ceramic foam structure.

The body 12 is formed to the required configuration for incorporation as a wear portion 13 of the finished brake disc and, as illustrated, comprises an annular body having opposed porous planar wear surfaces 14 and 16. The brake disc is produced by a casting technique which conveniently comprises squeeze casting which is a technique known per se and which comprises the introduction of molten metal into a first part of a mould, closing the mould under pressure so that the liquid metal fills the mould cavity without entrapping air, maintaining the metal under pressure whilst solidification thereof takes place to ensure that any shrinkage cavities are closed and filled, and then opening the mould and removing the cast article. The pressure applied to the molten metal is typically of the order of 45 MPa to 100 MPa and is typically sustained for a period of time of the order of 15 to 90 seconds. At the start of this sustained pressure the temperature of the molten metal is typically between 700° C. and 770° C., whereas at the end of the sustained pressure the temperature is typically between 250° C. and 400° C.

Thus to produce the brake disc 10 illustrated in the drawings, the rigid porous ceramic body 12 is placed in a first part of a mould cavity and the molten metal is introduced therein. In accordance with the invention the molten metal is a light metal alloy which will infiltrate the pore structure of the ceramic body 12 during the casting technique and, when a squeeze casting technique is utilised, the ceramic body may have a porosity within the range 25% to 45% voids by volume (vol. %). The light metal alloy in this example is a high temperature aluminum alloy such as that designated as 2618A (International Designation).

After the casting technique has been completed the brake disc is removed from the mould and, in the example illustrated, the disc 10 comprises a radially inner portion 18 of cast aluminum alloy with a radially outer wear portion 13 comprising the rigid porous ceramic body 12 infiltrated throughout its pore structure with the aluminum alloy. The portion 18 is provided with means, such as apertures 18a, to receive fasteners, to attach the disc to a hub or the like so as to be rotatable with a wheel.

Figure 3:
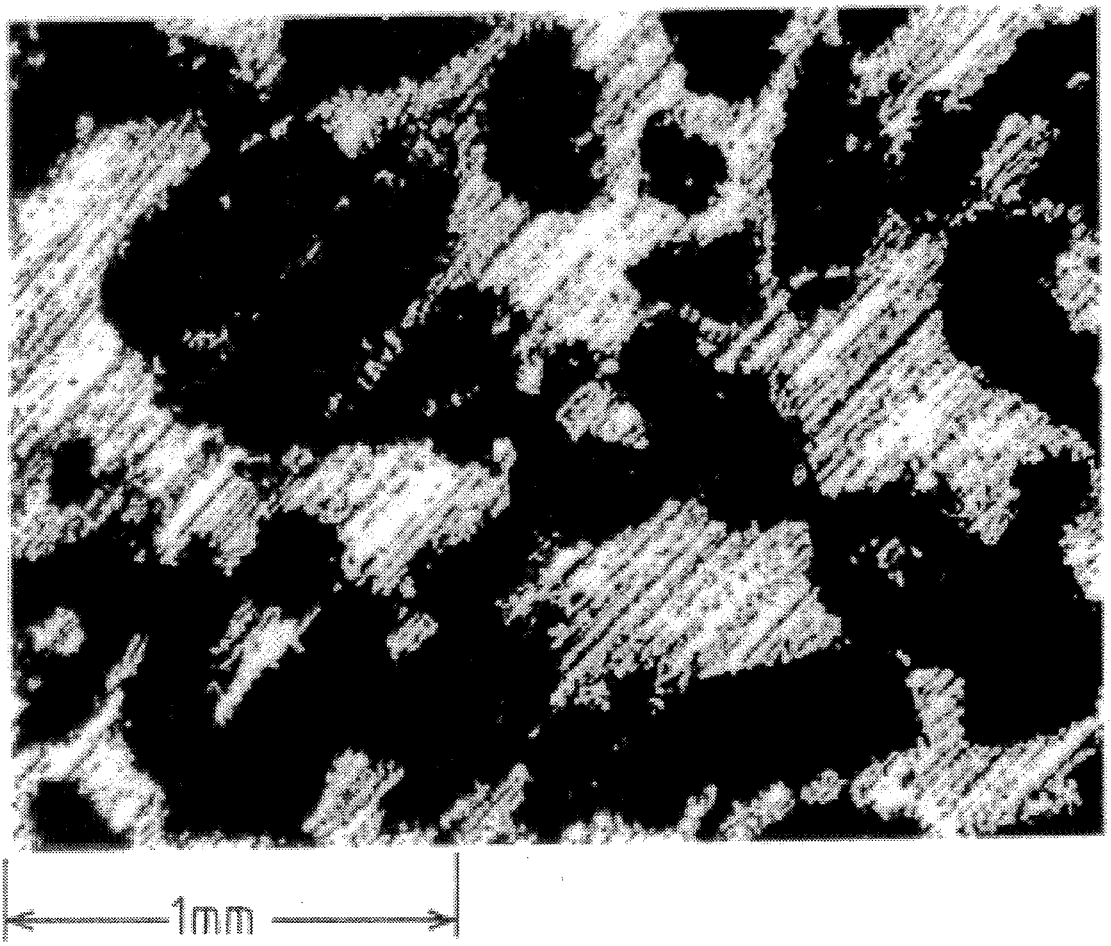
FIG. 3 is a photograph at a magnification of x 43 showing of a sample taken from a brake disc embodying the invention and of the same configuration as that shown in FIGS. 1 and 2 and on which a scale of 1 mm has been marked.

The wear portion 13 comprises about 65 vol. % of the ceramic body 12 and 35 vol. % of the aluminum alloy. If desired the wear portion 13 may comprise 55 vol. % to 75 vol. % of said rigid porous body and 45 vol. % to 25 vol. % of said light metal alloy. The pores of the body 12 have a size of about 1 mm but may have a size lying in the range 0.02 mm to 2.0 mm. FIG. 3 illustrates a typical microstructure of the wear portion 13, the microstructure of which is substantially uniform. In FIG. 3 the light areas are the aluminum alloy phase and the dark areas the silicon carbide ceramic body phase.

Use of the squeeze casting technique enables a near net shape product to be obtained whereby any subsequent machining is minimal.

In use, even repeated severe braking pressures applied to the wear surfaces of the disc 10 will not affect the structural integrity of the disc as a whole. Even if local softening of the aluminum alloy infiltrant occurs, the rigid ceramic body 12 will maintain the integrity of the disc. Since the rigid ceramic body extends throughout the full thickness of the wear portion 13 of the disc and provides both of said wear surfaces 14, 16 the integrity of the disc is maintained throughout its thickness in the wear portion. Thus in accordance with the invention there is produced a brake disc having substantial weight reduction in comparison with ferrous alloy discs as is currently required for automotive applications whilst at the same time exhibiting structural integrity together with properties of good wear resistance and good thermal conductivity.

The wear portion 13 comprising the infiltrated body 12 may, instead of comprising only an outer portion of the brake disc, may comprise the whole of the brake disc, or at least of an annular part thereof if desired.

If desired, the brake disc may be of different configuration to that described and illustrated hereinbefore. It may, for example, be provided with a boss or other part of suitable shape provided with apertures or other means for fixing so as to rotate with a wheel.

Although a single annular wear portion comprising the infiltrated ceramic body portion has been described extending throughout the thickness of the disc, if desired in any particular application it may be possible to provide more than one wear portion comprising a light metal alloy infiltrated ceramic body separated by portions of the disc of other configuration, depending upon the service conditions and the construction of the remainder of the brake disc.

However the construction described hereinbefore is preferred as it provides structural integrity of the disc throughout the thickness and throughout the lateral extent of the wear portion of the disc where severe heating and brake pressures are incurred.

Although silicon carbide is the preferred material for the ceramic body because of its relatively high thermal conductivity, if desired other porous ceramic material may be used such as alumina or zirconia, particularly where the conditions of service are less demanding. Similarly, although aluminum alloy is described above as the light metal alloy, if desired, the light metal alloy may be made of other metal such as magnesium based alloys.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

I claim:

1. A brake disc, for a disc brake assembly comprising at least one wear portion affording a wear surface, said portion comprising a rigid porous ceramic body infiltrated with a light metal alloy wherein the wear portion comprises 55 vol. % to 75 vol. % of said rigid porous body and 45 vol. % to 25 vol. % of said light metal alloy, and wherein the rigid porous ceramic body comprises a sintered coherent mass of ceramic particles providing an interconnected pore structure within which the infiltrant light metal alloy is received.

2. A brake disc as claimed in claim 1 wherein the rigid porous body has a porosity lying in the range 25% to 45% voids.

3. A brake disc as claimed in claim 2 wherein the rigid porous body has a pore size lying in the range 0.02 mm to 2 mm.

4. A brake disc as claimed in claim 1 wherein the material comprising the rigid porous ceramic body is silicon carbide.

5. A brake disc as claimed in claim 1 wherein the light metal alloy comprises an aluminum alloy.

6. A brake disc as claimed in claim 1 wherein the disc element comprising the infiltrated rigid porous ceramic body comprises the whole or substantially the whole of the brake disc.

7. A brake disc as claimed in claim 1 wherein the disc element comprising the infiltrated rigid porous ceramic body comprises a radially outer annular portion of the brake disc providing said wear areas, and a radially inner portion of the disc is provided by said light metal alloy material.

8. A brake disc as claimed in claim 1 wherein the infiltrated ceramic body extends throughout the thickness of the wear portion and affords a pair of opposed wear surfaces.

9. A method of producing a brake disc, for a disc brake assembly, comprising at least one wear portion affording a wear surface, comprising the steps of forming a rigid porous ceramic body having a pore structure substantially to a required finished configuration of said at least one wear portion area of the brake disc and infiltrating the pore structure of said body with a light metal alloy wherein the wear portion comprises 55 vol. % to 75 vol. % of said rigid porous body and 45 vol. % to 25 vol. % of said light metal alloy and wherein the rigid porous ceramic body is formed by sintering ceramic particles into a coherent mass to provide an interconnected pore structure for receiving infiltrant molten light metal alloy during production of the brake disc.

10. A method as claimed in claim 9 wherein the rigid porous body has a porosity lying in the range 25% to 45% voids.

11. A method as in claim 10 wherein the rigid porous body has a pore size lying in the range 0.02 mm to 2 mm.

12. A method as claimed in claim 9 wherein the method of infiltration comprises a casting technique wherein said rigid porous ceramic body is located in a mould and molten light metal alloy is cast around said body so as to infiltrate the pore structure thereof.

13. A method as claimed in claim 12 wherein the casting technique is a squeeze casting technique.

14. A method as claimed in claim 9 wherein the rigid porous ceramic body is formed to provide a disc element of the configuration of the whole or substantially the whole of the brake disc.

15. A method as claimed in claim 9 wherein the rigid porous ceramic body is formed to provide a disc element of the configuration of a radially outer annular portion of the brake disc providing said wear areas, and a radially inner portion of the disc is provided by said light metal alloy material.

* * * * *